(12) United States Patent
Wang et al.

(10) Patent No.: US 10,374,643 B2
(45) Date of Patent: Aug. 6, 2019

(54) TRANSMITTER WITH COMPENSATING MECHANISM OF PULLING EFFECT

(71) Applicant: Realtek Semiconductor Corporation, Hsinchu (TW)

(72) Inventors: Wen-Shan Wang, Tainan (TW); Yuan-Shuo Chang, Hsinchu (TW); Chih-Chieh Wang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 256 days.

(21) Appl. No.: 15/390,702

(22) Filed: Dec. 26, 2016

(65) Prior Publication Data

US 2017/0194990 A1  Jul. 6, 2017

(30) Foreign Application Priority Data

Dec. 31, 2015  (TW) .............................. 104144712 A (51) Int. Cl.
*H04B 1/04* (2006.01)
*H04L 27/00* (2006.01)
(Continued)

(52) U.S. Cl.
CPC ....... *H04B 1/0475* (2013.01); *H04L 27/0014* (2013.01); *H04L 27/364* (2013.01);
(Continued)

(58) Field of Classification Search
CPC ...... H03F 2200/336; H04B 2001/0416; H04B 1/525; H04B 2001/0425; H04B 1/62; H04B 17/13; H04B 1/0458; H04B 10/0775; H04B 17/11; H04B 1/475; H04L 27/206; H04L 27/2626; H04L 27/20; H04L 27/364;
(Continued)

(56) References Cited

U.S. PATENT DOCUMENTS 8,160,191 B2 *  4/2012  Row .................... H04B 1/1638
                                                    329/315
9,184,773 B2 * 11/2015  Nadiri ................. H04B 1/0475
(Continued)

FOREIGN PATENT DOCUMENTS

| CN | 101420242 A | 4/2009 |
| CN | 101868053 A | 10/2010 |
| CN | 203775241 U | 8/2014 |

OTHER PUBLICATIONS

Ahmad Mirzaei et al., "Pulling Mitigation in Wireless Transmitters," IEEE Journal of Solid-State Circuits, vol. 49, No. 9, Sep. 2014.

*Primary Examiner* — Rahel Guarino
(74) *Attorney, Agent, or Firm* — CKC & Partners Co., LLC (57) ABSTRACT

A transmitter with compensating mechanism of pulling effect includes an output unit and a correction unit. The output unit mixes a first correction signal and a second correction signal according to an oscillating signal to generate a modulated signal, and to amplify the modulated signal to generate a first output signal. The correction unit analyzes the power of the first output signal to generate a first coefficient and a second coefficient, and generate the first correction signal and the second correction signal according to the first coefficient, the second coefficient, an in-phase data signal, and a quadrature data signal.

20 Claims, 5 Drawing Sheets

(51) Int. Cl.
*H04L 27/36* (2006.01)
*H04B 17/11* (2015.01)

(52) U.S. Cl.
CPC ...... *H04B 17/11* (2015.01); *H04L 2027/0016* (2013.01); *H04L 2027/0018* (2013.01); *H04L 2027/0022* (2013.01); *H04L 2027/0067* (2013.01)

(58) Field of Classification Search
CPC ............... H04L 27/362; H04L 27/0014; H04L 2027/0016; H04L 2027/0018; H04L 2027/0022; H04L 2027/0067; H03L 7/081; H03L 7/093
See application file for complete search history.

(56) References Cited

U.S. PATENT DOCUMENTS

| | | | |
|---|---|---|---|
| 9,407,425 B1 * | 8/2016 | Huang | .................. H04L 27/364 |
| 2009/0088094 A1 | 4/2009 | Hsu et al. | |
| 2010/0026395 A1 | 2/2010 | Lane | |

\* cited by examiner

TRANSMITTER WITH COMPENSATING MECHANISM OF PULLING EFFECT

RELATED APPLICATIONS

This application claims priority to Taiwan Application Serial Number, 104144712, filed Dec. 31, 2015, which is herein incorporated by reference.

BACKGROUND

Technical Field

The present disclosure relates to a transmitter. More particularly, the present disclosure relates to a transmitter with compensating of pulling effect and an eliminating method thereof.

Description of Related Art

In various wireless communication systems, a transmitter can modulate the frequency, by using an oscillating signal generated from an oscillator, to generate a radio frequency signal that is suited for the wireless communication. However, as the size of transmitters become smaller and smaller, such a radio frequency signal could be inadvertently coupled back to the oscillator. As a result, a phase error may be introduced into the oscillating signal, and thus the overall performance of the transmitter may be reduced. The aforementioned phenomenon is commonly known as the "pulling effect."

In some approaches, the calibration mechanism for eliminating the pulling effect is arranged subsequent to a mixer. As a result, the required bandwidth for such calibration mechanism may be too high. The cost and complexity of the transmitter are thus increased. In some other approaches, the calibration circuit for eliminating the pulling effect is arranged in a phase locked loop. As a result, unwanted phase noise may be introduced and this may reduce the performance of the transmitter.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

As used herein, "signal A(t)" indicates a continuous signal in a form of the analog signal, "signal A[n]" indicates a discrete signal in a form of the digital signal, and corresponds to the signal A(t). For example, the signal A[n] can be converted, by a digital-to-analog converter, to the corresponding signal A(t). Similarly, in some other embodiments, the signal A(t) can be converted, by an analog-to-digital converter, to the corresponding signal A[n].

Figure 1A:
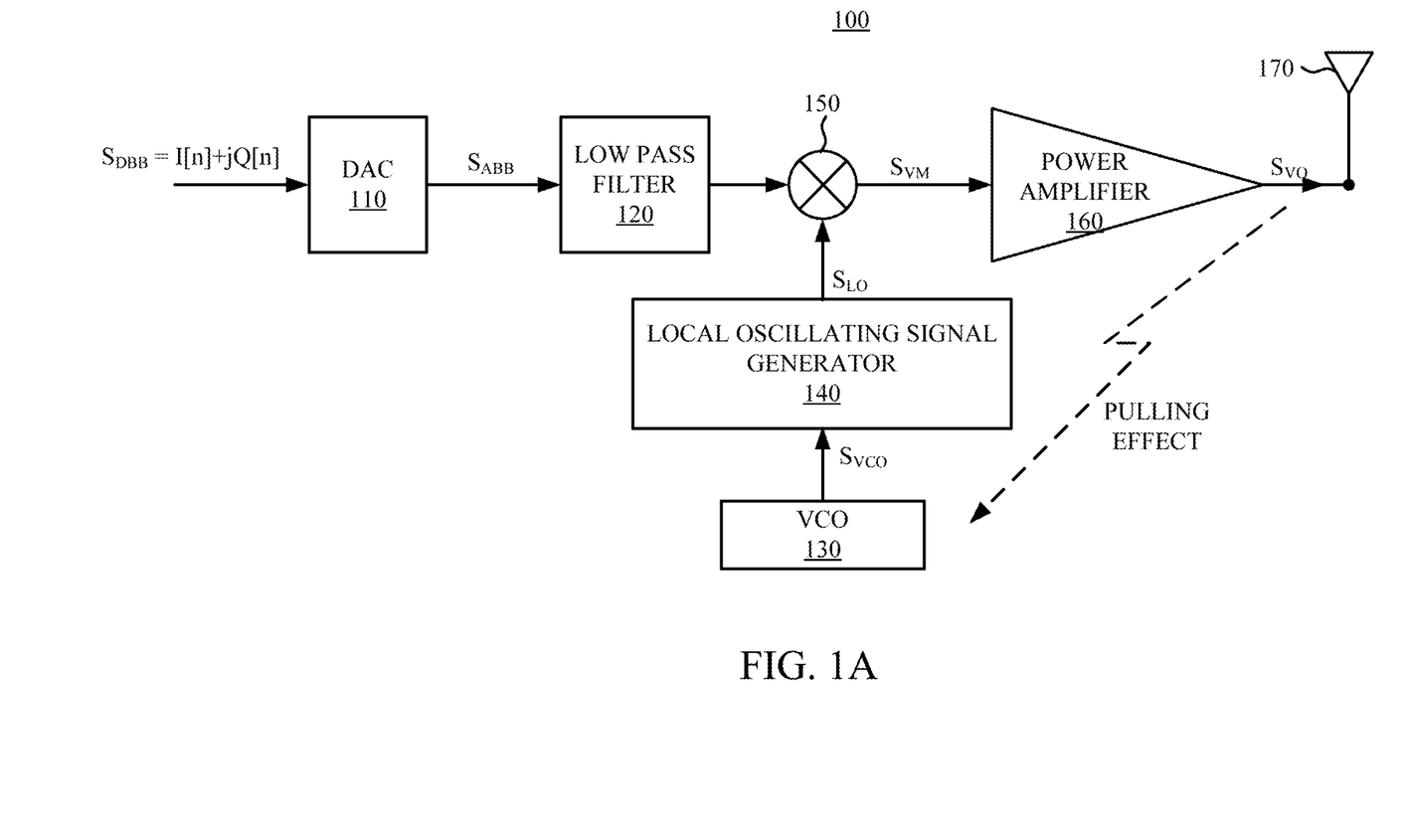
FIG. 1A is a schematic diagram of some embodiments of a transmitter in the present disclosure.

FIG. 1A is a schematic diagram of some embodiments of a transmitter in the present disclosure.

A digital-to-analog converter (DAC) 110 receives a baseband signal $S_{DBB}$, and generates a corresponding analog signal $S_{ABB}$ according to the baseband signal $S_{DBB}$. A low pass filter 120 removes the images on the analog signal $S_{ABB}$ introduced from the digital-to-analog transformation. A voltage-controlled oscillator (VCO) 130 generates an oscillating signal $S_{VCO}$ having a frequency $f_{VCO}$ to a local oscillating signal generator 140. The local oscillating signal generator 140 thus divides the oscillating signal $S_{VCO}$ to generate a local oscillating signal $S_{LO}$ having a local frequency $f_{LO}$ to a mixer 150. The mixer 150 upconverts the filtered analog signal $S_{ABB}$ according to the oscillating signal $S_{LO}$, to output a modulation signal $S_{VM}$. A power amplifier 160 amplifies the power of the modulation signal $S_{VM}$ to generate an output signal $S_{VO}$. An antenna 170 emits the output signal $S_{VO}$. The output signal $S_{VO}$ can be expressed as the following equation (1) in the time domain:

$$S_{VO}=GA_{BB}(t)\cos(\omega_{LO}t+\theta_{BB}(t)+\sigma) \quad (1)$$

In the equation (1), G is an overall gain of the transmitter 100, $A_{BB}(t)$ is the amplitude of the analog signal $S_{ABB}$, $\omega_{LO}$ is a radian frequency corresponding to the local frequency $f_{LO}$, $\theta_{BB}(t)$ is the phase of the analog signal $S_{ABB}$, and $\sigma$ is an additional phase introduced during the baseband signal $S_{DBB}$ passes the transmitter 100.

When the pulling effect is present in the VCO 130, the output signal $S_{VO}$ is able to be amended as the following equation (2):

$$S_{VO}=GA_{BB}(t)\cos(\omega_{LO}t+\theta_{BB}(t)+\sigma+\theta(t)) \quad (2)$$

where $\theta(t)$ is the phase error introduced from the pulling effect. If it is assumed that the additional phase $\sigma$ is 0, and the gain G of the transmitter 100 is 1, the output signal $S_{VO}$ can be further simplified as the following equation (3):

$$S_{VO}=A_{BB}(t)\cos(\omega_{LO}t+\theta_{BB}(t)+\theta(t)) \quad (3)$$

The equation (3) is expanded to obtain the following equation (4):

$$\begin{aligned}S_{VO} &= [A_{BB}(t)\cos(\theta_{BB}(t))\cos(\theta(t))\cos(\omega_{LO}t)] + \\ &\quad [A_{BB}(t)\sin(\theta_{BB}(t))\cos(\theta(t))(-\sin(\omega_{LO}t))] + \\ &\quad [A_{BB}(t)\cos(\theta_{BB}(t))\sin(\theta(t))(-\sin(\omega_{LO}t))] - \\ &\quad [A_{BB}(t)\sin(\theta_{BB}(t))\sin(\theta(t))(\cos(\omega_{LO}t))] \\ &= [I(t)\cos(\theta(t))\cos(\omega_{LO}t) + Q(t)\cos(\theta(t))(-\sin(\omega_{LO}t))] + \\ &\quad [I(t)\sin(\theta(t))(-\sin(\omega_{LO}t)) - Q(t)\sin(\theta(t))(\cos(\omega_{LO}t))].\end{aligned} \quad (4)$$

where $I(t)=S_{ABB}(t)\cos(\theta_{BB}(t))$, and I(t) is an in-phase data signal corresponding to the baseband signal $S_{DBB}$. $Q(t)=S_{ABB}(t)\sin(\theta_{BB}(t))$ and Q(t) is a quadrature data signal corresponding to the baseband signal $S_{DBB}$.

Figure 1B:
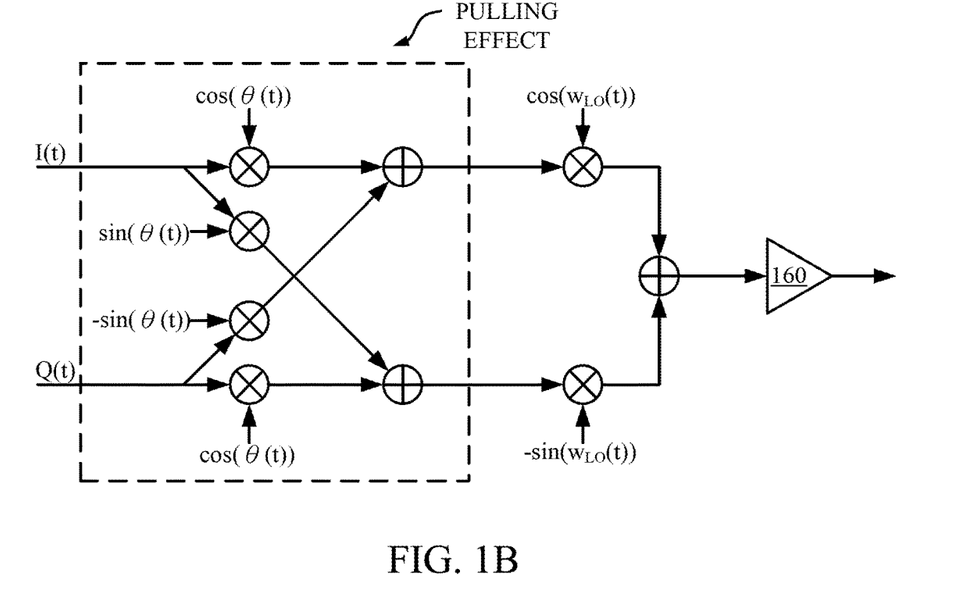
FIG. 1B is a schematic diagram illustrating a mathematical model, for the transmitter occurring the pulling effect, in the time domain.

FIG. 1B is a schematic diagram illustrating a mathematical model, for the transmitter 100 occurring the pulling effect, in the time domain.

Figure 1C:
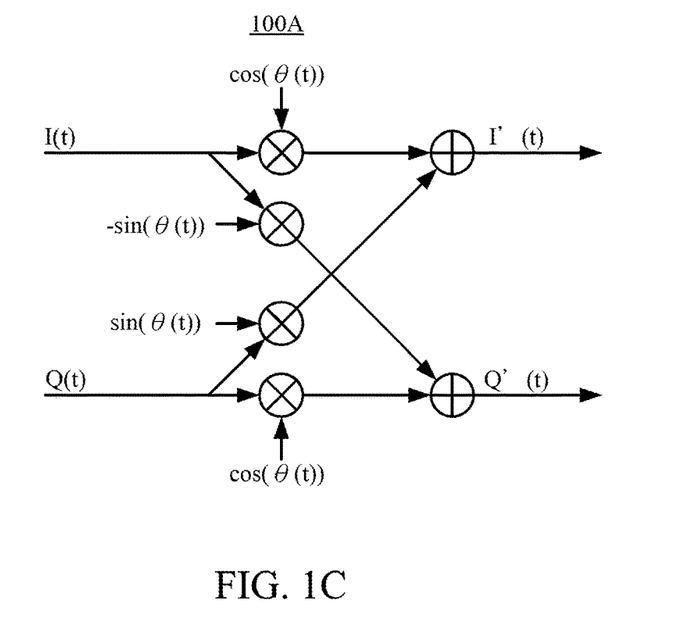
FIG. 1C is a schematic diagram illustrating a mathematical model of a correction matrix for eliminating the pulling effect.

FIG. 1C is a schematic diagram illustrating a mathematical model of a correction matrix for eliminating the pulling effect. With the mathematical model illustrated in FIG. 1B, the present disclosure provides a correction method for eliminating the pulling effect as described as follows.

In some embodiments, before being mixed, the analog signal $S_{ABB}$ can be calibrated with the correction matrix 100A in FIG. 1C, to eliminate the phase error $\theta(t)$ introduced from the pulling effect. According to the respective mathematical models illustrated in FIG. 1B and FIG. 1C, it can be obtained that the in-phase data signal I(t) and the quadrature data signal Q(t) are satisfied with the following equation (5):

$$\begin{bmatrix} I(t) \\ Q(t) \end{bmatrix} = \begin{bmatrix} \cos(\theta(t)) & -\sin(\theta(t)) \\ \sin(\theta(t)) & \cos(\theta(t)) \end{bmatrix} \begin{bmatrix} \cos(\theta(t)) & \sin(\theta(t)) \\ -\sin(\theta(t)) & \cos(\theta(t)) \end{bmatrix} \begin{bmatrix} I(t) \\ Q(t) \end{bmatrix} \quad (5)$$

According to the equation (5), the analog signal $S_{ABB}$ is pre-processed by the correction matrix 100A to eliminate the phase error $\theta(t)$ introduced from the pulling effect.

If the equation (5) is expressed as in a form of the complex function, as the following equation (6):

$$I'(t)+jQ'(t)=[I(t)+Q(t)]e^{[-j\theta(t)]}=[I(t)+Q(t)][\alpha(t)+j\beta(t)] \quad (6)$$

where I'(t)+jQ'(t) is a correction signal, which is generated from processing of the correction matrix 100A, a phase correction signal $\alpha(t)$ is $\cos(\theta(t))$, and a phase correction signal $\beta(t)$ is $-\sin(\theta(t))$. Effectively, by using the correction matrix 100A to pre-process the analog signal $S_{ABB}$, a pre-phase correction signal $\varphi(t)$ is able to be generated, in which $\varphi(t)=-\theta(t)$. As a result, when the correction signal I'(t)+jQ'(t) is mixed through the mixer 150, the pre-phase correction signal $\varphi(t)$ and the phase error $\theta(t)$ are canceled out each other. Accordingly, the impact of the pulling effect is thus eliminated.

With reference to the related descriptions and FIG. 3 of a reference document (Pulling Mitigation in Wireless Transmitters IEEE JSSC vol. 49, NO. 9, September 2014.), the phase error $\theta(t)$ is related to the baseband signal $S_{DBB}$. The analog signal $S_{ABB}$, which the baseband signal $S_{DBB}$ corresponds to, is able to be linearly composed of the in-phase data signal I(t) and the quadrature data signal Q(t). In other words, $S_{ABB}$=I(t)+jQ(t). According to FIG. 3 of the reference document and the equation (6), the pre-phase correction signal $\varphi(t)$ can be expressed as the following equation (7) after the coordinate transformation:

$$\varphi[n]=C1(I^2[N]-Q^2[N])+C2(2I[n]Q[n]) \quad (7)$$

Therefore, various embodiments described in the present disclosure can utilize coefficients C1 and C2 in the equation (7) to generate the pre-phase correction signal $\varphi[n]$. As discussed above, since $\varphi(t)=-\theta(t)$, after the pre-phase correction signal $\varphi[n]$ is determined, the correction signal I'(t)+jQ'(t) can be generated, by using the correction matrix 100A, to the transmitter 100, in order to eliminate impacts of the pulling effect.

The following paragraphs provide various embodiments to illustrate the applications of the equation (7). As described above, the embodiments in FIGS. 1A-1C are presented in a form of the complex function. For a clearer explanation, the following embodiments are presented in a concept of the frequency domain or the time domain.

Figure 2:
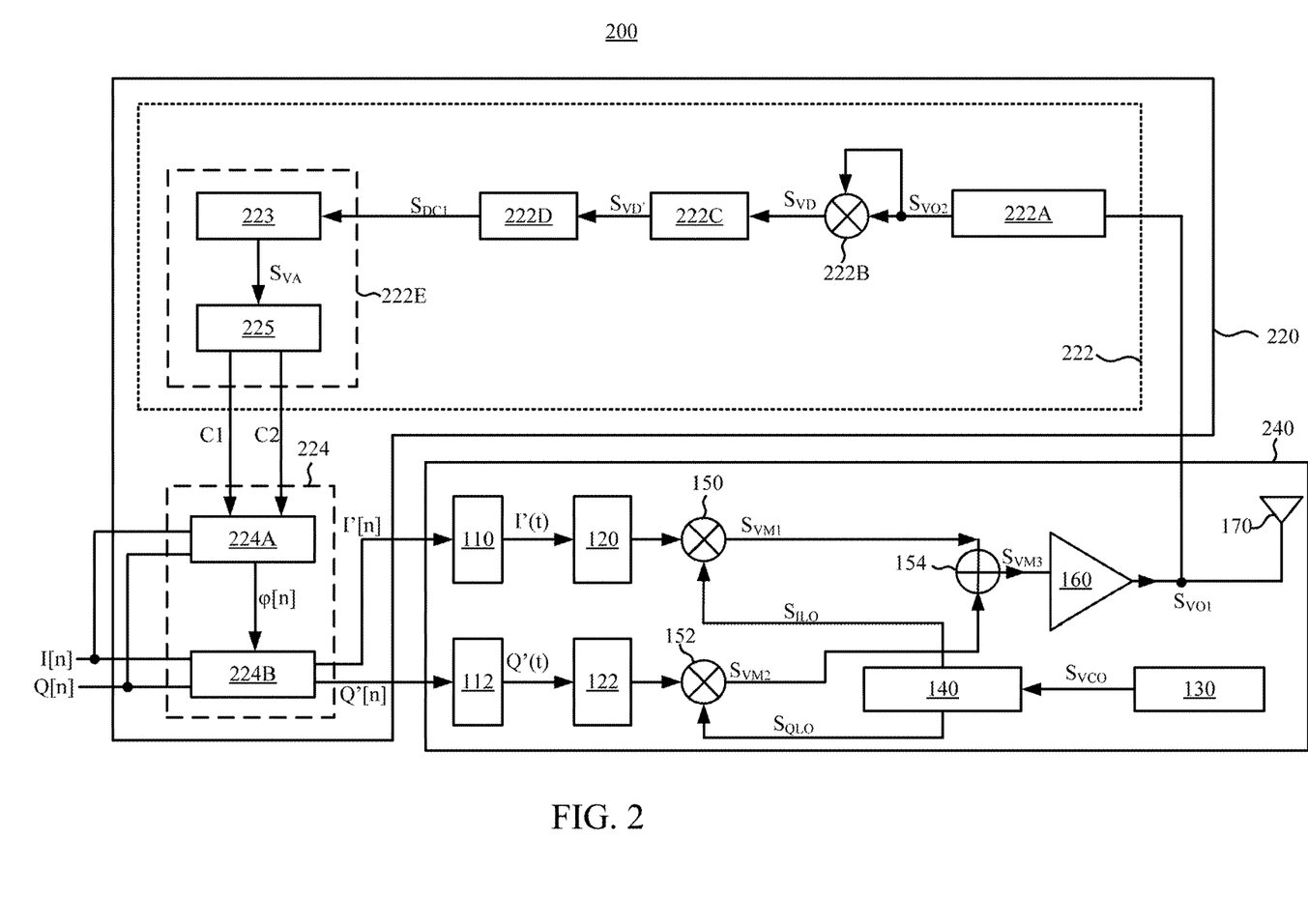
FIG. 2 is a schematic diagram of a transmitter in accordance with some embodiments of the present disclosure.

FIG. 2 is a schematic diagram of a transmitter in accordance with some embodiments of the present disclosure. For ease of understanding, like elements in FIG. 2 are designated with the same reference numbers with respect to FIGS. 1A-1C.

As shown in FIG. 2, the transmitter 200 includes a correction unit 220 and an output unit 240. The output unit 240 includes the DACs 110 and 112, the low pass filters 120 and 122, the VCO 130, the local oscillating signal generator 140, the mixers 150 and 152, the adder 154, the power amplifier 160, and the antenna 170.

The DAC 110 generates the correction signal I'(t) according to the correction signal I'[n]. The low pass filter 120 removes the images, which are introduced from the digital-to-analog conversion, on the correction signal I'(t). The mixer 150 up-modulates the filtered correction signal I'(t) according to the local oscillating signal $S_{ILO}$, to output a modulation signal $S_{VM1}$.

The DAC 112 generates the correction signal Q'(t) according to the correction signal Q'[n]. The low pass filter 122 removes the images on the correction signal Q'(t). The mixer 152 up-modulates the filtered correction signal Q'(t) according to the local oscillating signal $S_{QLO}$, to output a modulation signal $S_{VM2}$. The adder 154 sums up the modulation signal $S_{VM1}$ and the modulation signal $S_{VM2}$, to generate a modulation signal $S_{VM3}$. The power amplifier 170 amplifies the modulation signal $S_{VM3}$ to generate an output signal $S_{VO1}$. The antenna 170 emits the output signal $S_{VO1}$ outwardly.

In some embodiments, the correction unit 220 includes a feedback control circuit 222 and a calculation circuit 224. The feedback control circuit 222 analyzes the output signal $S_{VO1}$ to generate a digital code $S_{DC1}$, and generates the coefficients C1 and C2 in the aforementioned equation (7) according to the digital code $S_{DC1}$. The calculation circuit 224 is able to generate the correction signals I'[n] and Q'[n] to the output unit 240 according to the coefficients C1 and C2, the in-phase data signal I[n], and quadrature data signal Q[n].

The feedback circuit 222 includes an attenuator 222A, a self-mixer 222B, an amplifier 222C, an analog-to-digital converter (ADC) 222D, and a correction circuit 222E.

The attenuator 222A reduces the power of the output signal $S_{VO1}$, to generate an output signal $S_{VO2}$ to the self-mixer 222b. As such, the self-mixer 222B and subsequent circuits are prevented from directly receiving the output signal $S_{VO1}$ having a high power, to increase the circuit reliability. In some embodiments, the attenuator 222A is implemented with at least one coupling capacitor. The self-mixer 222B modulates the output signal $S_{VO2}$ according to the output signal $S_{VO2}$, to generate a detection signal $S_{VD}$. In some embodiments, the self-mixer 222B is implemented with a mixer circuit having a pair of cross-coupled input transistors.

In some other embodiments, if the gain of the power amplifier 160 is lower, the output signal $S_{VO1}$ can be directly input to the self-mixer 222B to generate the detection signal $S_{VD}$. The arrangements above are given for illustrative purposes only. Person skilled in the art can adjust the arrangements of the attenuator 222A and the self-mixer 222B.

The amplifier 222C amplifies the detection signal $S_{VD}$ to generate a detection signal $S_{VD'}$. In some embodiments, the amplifier 222C is an amplifier circuit having a fixed gain. In some other embodiments, the amplifier 222C is an amplifier circuit having an adjustable gain. The ADC 222D generates digital code $S_{DC1}$ according to the detection signal $S_{VD'}$. The correction circuit 222E generates the aforementioned coefficients according to the digital code $S_{DC1}$.

Reference is now made to FIG. 1 and FIG. 8 of the reference document above and the related descriptions thereof. The frequency of the output signal $S_{VO}$ of the transmitter 100 is $f_{LO}+f_M$, in which $f_M$ is the frequency of the analog signal $S_{ABB}$, which can be also referred to as the frequency of the quadrature data signal Q(t) or that of the in-phase signal I(t). When being suffered from the pulling effect, two main types of noise, which have a frequency $f_{LO}+3f_M$ and a frequency $f_{LO}-f_M$ respectively, are present in the output terminal of the transmitter 100. In other words, the output signal $S_{VO1}$ mainly has signal components having a frequency $f_{LO}+f_M$, a frequency $f_{LO}+3f_M$, a frequency $f_{LO}-f_M$, respectively. According to the descriptions above, the detection signal $S_{VD}$ at least includes signal components having a frequency $2f_M$ and a frequency $4f_M$. In other words, in some embodiments, the frequency of the signal components in the detection signal $S_{VD}$ is about two times or four times of the frequency of the quadrature data signal Q(t) or the in-phase signal I(t). Accordingly, the digital code DC1, which is generated by the ADC 222D, at least includes signal components having a frequency $2f_M$ and a frequency $4f_M$. Therefore, the signal components, which have the frequency $2f_M$ and the frequency $4f_M$, can be utilized to indicate noise impact from the pulling effect.

In some embodiments, the correction circuit 222E includes a signal power detector 223 and an adjust circuit 225. The signal power detector 223 detects the power of the signal components having a frequency $2f_M$ and a frequency $4f_M$, to generate an adjust signal $S_{VA}$. The adjust circuit 225 adjusts the coefficients C1-C2, and outputs the same to the calculation circuit 224. In some other embodiments, compared with the signal component having the frequency $2f_M$, the frequency of the signal components having the frequency $4f_M$ is much higher. Accordingly, the signal component having the frequency $4f_M$ is significantly attenuated during the transmission. Therefore, in this embodiment, the signal power detector 223 can only detect the power of the signal component having the frequency $2f_M$, to generate the adjust signal $S_{VA}$.

With the arrangements of the feedback control circuit illustrated above, the coefficients C1-C2 can be adjusted, to reduce the power of the noise signal components having the frequency $f_{LO}+3f_M$ and the frequency $f_{LO}-f_M$. Effectively, the impact of the pulling effect on the transmitter 200 is reduced.

Figure 3:
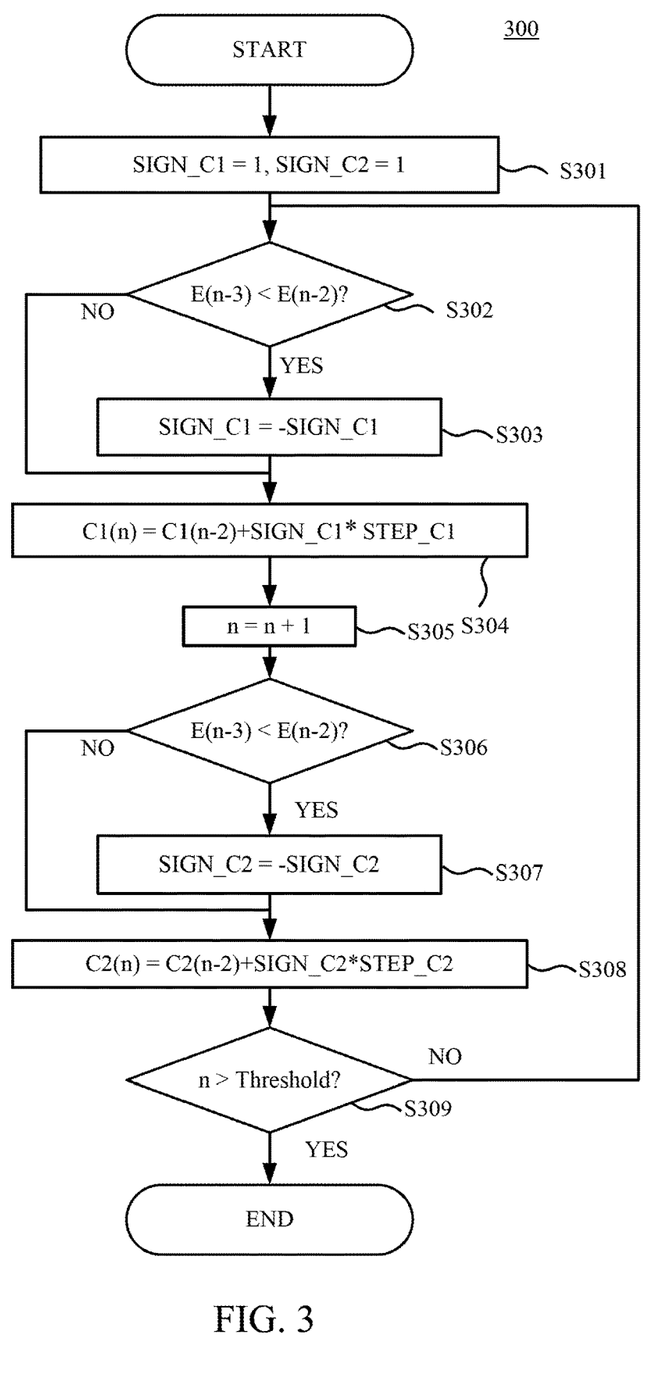
FIG. 3 is a flow chart of an adjust method for adjusting the coefficients C1-C2, in accordance with some embodiments of the present disclosure.

FIG. 3 is a flow chart of an adjust method for adjusting the coefficients C1-C2, in accordance with some embodiments of the present disclosure. In some embodiments, the adjust circuit 225 is implemented by digital circuits. In some other embodiments, the digital circuits include a processing unit, which performs the method 300 in FIG. 3 to generate the coefficients C1-C2. The processing unit obtains the power of the signal components having the frequency $2f_M$ and the frequency $4f_M$ from the adjust signal $S_{VA}$.

In some embodiments, the coefficients C1-C2 are alternately adjusted by comparing the powers of the signal components, which are previously detected twice in a row, having the frequency $2f_M$ or $4f_M$. In FIG. 3, E(n) indicates the power of the signal component having the frequency $2f_M$ or $4f_M$, and n indicates the number of times the coefficients C1-C2 are adjusted. In operation S301, adjustment trends for the coefficients C1-C2 are an increment, i.e., SIGN_C1 and SIGN_C2 are configured to be one, in which SIGN_C1 and SIGN_C2 are the adjustment trends for the coefficients C1-C2, respectively. In operation S302, check whether the power (i.e., E(n-3)) of the signal component, which is detected in the previous three times, having the frequency $2f_M$ or $4f_M$, is lower than the power (i.e., E(n-2)) of the signal component, which is detected in the previous two times, having the frequency $2f_M$ or $4f_M$. If yes, operation S303 is performed. Otherwise, operation S304 is performed.

In operation S303, the adjustment trend for the coefficient C1 is adjusted to be the opposite of the current adjustment trend for the coefficient C1, i.e., SIGN_C1 is set to be −SIGN_C1. As discussed above, the coefficients C1-C2 are adjusted to reduce the power of the signal components having the frequency $f_{LO}+3f_M$ and the frequency $f_{LO}-f_M$. In this example, when the power E(n-3) is lower than the power E(n-2), it indicates that an error has occurred in the adjustment trend for the coefficient C1. Accordingly, the adjustment trend for C1 is adjusted. Alternatively, when the power E(n-3) is higher than the power E(n-2), it indicates that the adjustment trend for the coefficient C1 is correct.

In operation S304, the coefficient C1(n) is generated, in which C1(n)=C1(n-2)+SIGN_C1*STEP_C1. In the above equation, C1(n-2) indicates the value of the coefficient C1 at the previous two times, and STEP_C1 is a predetermined adjustment value for the coefficient C1. In this example in which operation S301 is performed, when the error is occurred in the adjustment trend for the coefficient C1, the coefficient C1 can be changed to subtract from the predetermined adjustment value STEP_C1, to generate a new coefficient C1. Alternatively, when the adjustment trend for the coefficient C1 is correct, the coefficient C1 still can be increased with the predetermined adjustment value STEP_C1, to generate a new coefficient C1.

In operation S305, the new coefficient C1(n) is output, the coefficient C2(n) is kept, and the number of the adjust time n is increased, i.e., n=n+1. In operation S306, determine whether the power (i.e., E(n-3)) of the signal component, which is detected in the previous three times, having the frequency $2f_M$ or $4f_M$, is lower than the power (i.e., E(n-2)) of the signal component, which is detected in the previous two times, having the frequency $2f_M$ or $4f_M$. If yes, operation S307 is performed. Otherwise, operation S308 is performed. In operation S307, the adjustment trend for the coefficient C2 is adjusted to be the opposite of the current adjustment trend for the coefficient C2, i.e., SIGN_C2 is set to be −SIGN_C2. In operation S308, the coefficient C2 is generated, in which C2(n)=C2(n-2)+SIGN_C2*STEP_C2. In the above equation, C2(n-2) indicates the value of the coefficient C2 at the previous two times, and STEP_C2 is a predetermined adjustment value for the coefficient C2.

After the coefficient C1 is adjusted, it is able to check whether an error is occurred in the adjustment trend for the coefficient C2 with the same operation. The coefficient C2 can be output after the adjustment trend for the coefficient C2 is determined. The operations S306-S308 are similar with the operations S302-S304, and thus the repetitious descriptions are not given here.

In operation S309, check whether the number of the adjust times n exceeds a threshold value. If yes, the adjustment is terminated, and the coefficients C1-C2 are output. Otherwise, operation S302 is then performed again, to further adjust the coefficient C1-C2 to be better values. With proper arrangement of operation S309, the operation efficiency of the transmitter 200 can be kept.

The arrangements of adjusting the coefficients C1-C2 are given for illustrative purposes only. Various arrangements that can adjust the coefficients C1-C2 are within the contemplated scope of the present disclosure.

With continued reference to FIG. 2, the calculation circuit 224 includes a phase correction circuit 224A and a correction signal generation circuit 224B. The phase correction circuit 224A generates the pre-phase correction signal φ[n] according to the coefficients C1-C2, the in-phase data signal I[n], and the quadrature data signal Q[n]. The correction signal generation circuit 224B generates correction signals I'[n] and Q'[n] to the DACs 110 and 112, according to the pre-phase correction signal φ[n], the in-phase data signal I[n], and the quadrature data signal Q[n]. In some embodiments, the correction signal generation circuit 224B can be implemented with digital circuits of the correction matrix 100A in FIG. 1C. In other words, according to the pre-phase correction signal φ[n] generated by the phase correction circuit 224A, the correction signal generation circuit 224B performs the calculation of the equation (5) to generate the correction signals I'(t) and Q'(t).

Figure 4:
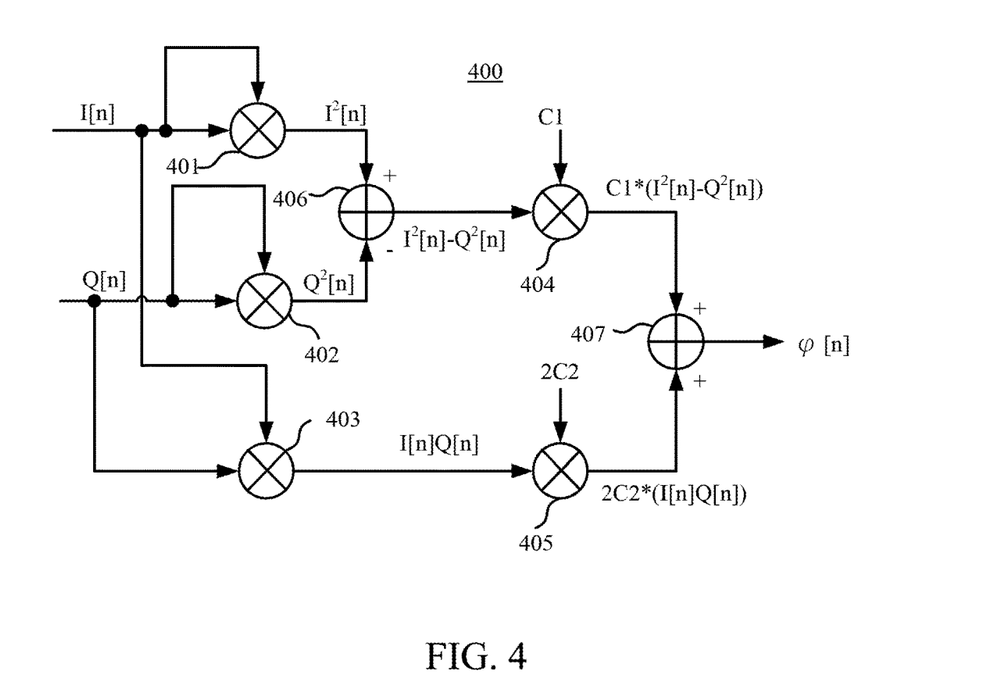
FIG. 4 is a schematic diagram of some embodiments of the phase correction circuit in FIG. 2.

FIG. 4 is a schematic diagram of some embodiments of the phase correction circuit in FIG. 2. As shown in FIG. 4, in this embodiment, the phase correction circuit 400 includes multipliers 401-405, a subtractor 406, and an adder 407. In some embodiments, the phase correction circuit 400 is applicable to narrow-band applications.

The multiplier 401 multiplies the in-phase data signal I[n] by the square, to generate an operation value $I^2[n]$. The multiplier 402 multiplies the quadrature data signal Q[n] by the square, to generate an operation value $Q^2[n]$. The multiplier 403 multiplies the in-phase data signal I[n] with the quadrature data signal Q[n], to generate an operation value I[n]Q[n]. The subtractor 406 subtracts the operation value $Q^2[n]$ from the operation value $I^2[n]$, to generate an operation value $I^2[n]-Q^2[n]$. The multiplier 404 multiplies the coefficient C1 with the operation value $I^2[n]-Q^2[n]$, to generate an operation value $C1*(I^2[n]-Q^2[n])$. The multiplier 405 multiplies two times of the coefficient C2 with the operation value I[n]Q[n], to generate an operation value 2C2*I[n]Q[n]. The adder 407 sums up the operation value $C1*(I^2[n]-Q^2[n])$ and the operation value 2C2*I[n]Q[n], to generate the pre-phase correction signal φ[n]. Effectively, the phase correction circuit 400 generates the pre-phase correction signal φ[n] in the equation (7), and transmits the same to the output unit 240 to eliminate the impact of the pulling effect.

Figure 5:
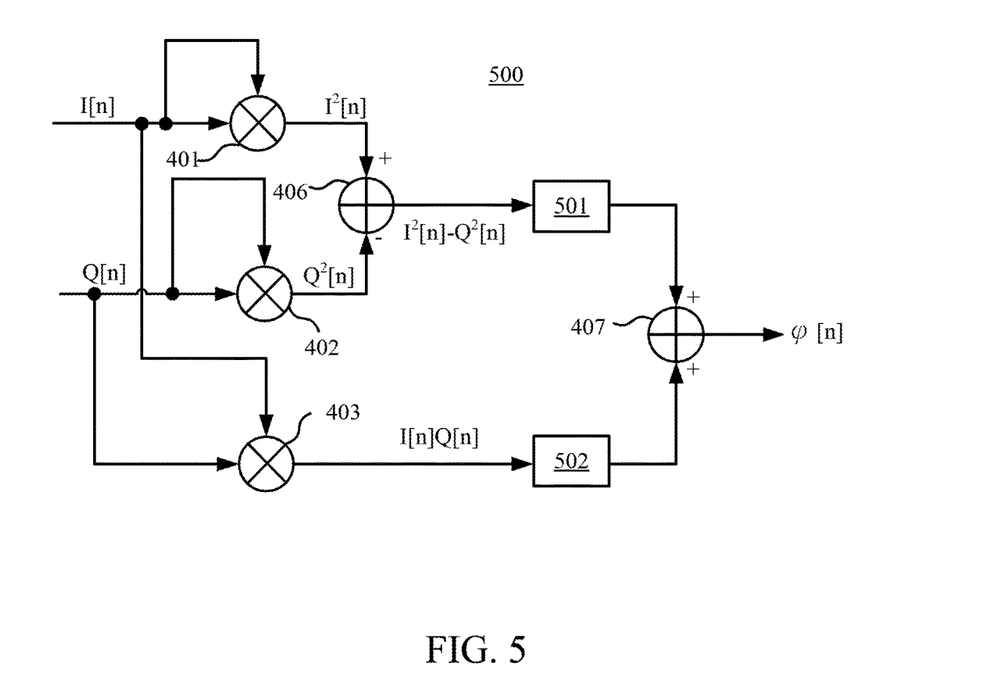
FIG. 5 is a schematic diagram of some other embodiments of the phase correction circuit in FIG. 2.

FIG. 5 is a schematic diagram of some other embodiments of the phase correction circuit in FIG. 2. For ease of understanding, like elements in FIG. 5 are designated with the same reference number with respect to FIG. 4. Compared with the embodiments in FIG. 4, the phase correction circuit 500 is applicable to wide-band applications.

As shown in FIG. 5, in this embodiment, the phase correction circuit 500 includes the multipliers 401-403, the subtractor 406, the adder 407, and finite impulse response (FIR) filters 501-502. The operations of the multipliers 401-403, the subtractor 406, and the adder 407 in FIG. 5 are the same as the operations of the embodiments in FIG. 4, and thus repetitious descriptions are not given here.

In some embodiments, each coefficient in each tap of the FIR filters 501-502 can be designed, such that the FIR filters 501-502 can generate required operation values. For example, in the bandwidth, which is desired to be corrected, of the transmitter 200, N testing signals having a frequency $f_i$ are inputted to the transmitter 200 in sequence, where i=1, 2, 3, . . . , N, and N is a positive integer. The signal power detector 223 then detects the power of the signal components having the frequency $2f_i$ or $4f_i$ in the detection signal $S_{VD}$. Meanwhile, the power of the signal components having the frequency $2f_i$ or $4f_i$ are reduced by using the method 300 above to adjust the coefficients C1-C2. When the power of the signal components having the frequency $2f_i$ or $4f_i$ are reduced to be minimum, the current coefficients C1-C2 are stored as filtering coefficients C1,i and C2,i. After N groups of the filtering coefficients C1,i and C2,i are obtained, an inverse Fourier transform is performed with the filtering coefficients C1,i-C1,N and conjugates of the filtering coefficients C1,i-C1,N. As a result, the coefficients of 2N taps of the FIR filter 501 are obtained according to real parts in the transformed result. Similarly, an inverse Fourier transform are performed with the filtering coefficients 2C2,i-2C2,N and conjugates of the filtering coefficients 2C2,i-2C2,N. As a result, the coefficients of 2N taps of the FIR filter 502 are obtained according to real parts in the transformed result. Effectively, when the operation values $I^2[n]-Q^2[n]$ and I[n]Q[n] are transmitted through the FIR filters 501-502, the FIR filters 501-502 can output the corresponding operation value to the adder 407, to generate the pre-phase correction signal φ[n].

As discussed above, the transmitter provided in the present disclosure instantly detects the power of the output signal, to generate the correction signal for eliminating errors caused from the pulling effect. As a result, the system performance of the transmitter and the accuracy of transmitting data can be improved.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A transmitter, comprising:
   an output circuit configured to mix a first correction signal and a second correction signal according to an oscillating signal to generate a modulation signal, and amplify the modulation signal, to generate a first output signal, wherein the first correction signal and the second correction signal are for eliminating a pulling effect associated with the first output signal; and
   a correction circuit configured to analyze a power of the first output signal to generate a first coefficient and a second coefficient, and generate the first correction signal and the second correction signal according to the first coefficient and the second coefficient, an in-phase data signal, and a quadrature data signal.

2. The transmitter of claim 1, wherein the correction circuit comprises a feedback control circuit, and the feedback control circuit comprises:
   a self-mixer configured to modulate the first output signal according to the first output signal, to generate a detection signal;
   an amplifier configured to amplify the detection signal;
   an analog-to-digital converter configured to generate a digital code according to the amplified detection signal; and
   a correction circuit configured to generate the first coefficient and the second coefficient according to the digital code.

3. The transmitter of claim 2, wherein the correction circuit comprises:
   a signal power detector configured to detect a power of a signal component according to the digital code to generate an adjust signal, wherein a frequency of the signal component is two times or four times of a frequency of the in-phase data signal or a frequency of the quadrature data signal; and an adjust circuit is configured to adjust the first coefficient and the second coefficient according to the adjust signal, in order to reduce the power of the signal component.

4. The transmitter of claim 3, wherein the adjust circuit is configured to obtain the power of the signal component according to the adjust signal, and sequentially adjust the first coefficient and the second coefficient according to the power of the signal component.

5. The transmitter of claim 4, wherein the adjust circuit is configured to alternately adjust the first coefficient and the second coefficient according to the power, which are previously detected twice in a row, of the signal component.

6. The transmitter of claim 4, wherein when a number of times the first coefficient and the second coefficient are adjusted by the adjust circuit exceeds a threshold value, the adjust circuit is configured to stop adjusting the first coefficient and the second coefficient.

7. The transmitter of claim 2, wherein the feedback control circuit comprises:
   an attenuator configured to reduce the power of the first output signal, to generate a second output signal to the self-mixer;
   wherein the self-mixer is further configured to generate the detection signal according to the second output signal.

8. The transmitter of claim 1, wherein the correction circuit further comprises a calculation circuit, and the calculation circuit comprises:
   a phase correction circuit configured to generate a pre-phase correction signal according to the first coefficient, the second coefficient, the in-phase data signal, and the quadrature data signal; and
   a correction signal generation circuit configured to generate the first correction signal and the second correction signal.

9. The transmitter of claim 8, wherein the phase correction circuit comprises:
   a first multiplier configured to multiply the in-phase data signal with the in-phase data signal, to generate a first operation value;
   a second multiplier configured to multiply the quadrature data signal with the quadrature data signal, to generate a second operation value;
   a third multiplier configured to multiply the in-phase data signal with the quadrature data signal, to generate a third operation value;
   a subtractor configured to subtract the second operation value from the first operation value, to generate a fourth operation value;
   a fourth multiplier configured to multiply the first coefficient with the fourth operation value, to generate a fifth operation value;
   a fifth multiplier configured to multiply two times of the second coefficient with the third operation value to generate a sixth operation value; and
   an adder configured to sum up the fifth operation value with the sixth operation value, to generate the pre-phase correction signal.

10. The transmitter of claim 8, wherein the phase correction circuit comprises:
    a first multiplier configured to multiply the in-phase data signal with the in-phase data signal, to generate a first operation value;
    a second multiplier configured to multiply the quadrature data signal with the quadrature data signal, to generate a second operation value;
    a third multiplier configured to multiply the in-phase data signal with the quadrature data signal, to generate a third operation value;
    a subtractor configured to subtract the second operation value from the first operation value, to generate a fourth operation value;
    a first finite impulse response filter configured to receive the fourth operation value, and output a fifth operation value;
    a second finite impulse response filter configured to receive the third operation value, and output a sixth operation value; and
    an adder configured to sum up the fifth operation value and the sixth operation value, to generate the pre-phase correction signal.

11. A correction method, comprising:
    analyzing a power of a first output signal output by a transmitter, to generate a first coefficient and a second coefficient;
    generating a pre-phase correction signal according to the first coefficient and the second coefficient; and
    generating a first correction signal and a second correction signal to the transmitter according to the pre-phase correction signal, an in-phase data signal, and a quadrature data signal, wherein the first correction signal and the second correction signal are for eliminating a pulling effect associated with the first output signal.

12. The correction method of claim 11, wherein analyzing the power of the first output signal comprises:
    modulating the first output signal according to the first output signal to generate a detection signal;
    amplifying the detection signal by an amplifier;
    generating, by an analog-to-digital converter, a digital code according to the amplified detection signal; and
    generating the first coefficient and the second coefficient according to the digital code.

13. The correction method of claim 12, further comprising:
    attenuating the power of the first output signal to generate a second output signal;
    wherein the detection signal is generated according to the second output signal.

14. The correction method of claim 12, wherein generating the first coefficient and the second coefficient comprises:
    detecting a power of a signal component according to the digital code to generate an adjust signal, wherein a frequency of the signal component is two times or four times of a frequency of the in-phase data signal or a frequency of the quadrature data signal; and
    adjusting the first coefficient and the second coefficient according to the adjust signal to reduce the power of the signal component.

15. The correction method of claim 14, wherein adjusting the first coefficient and the second coefficient comprises:
    comparing a first power and a second power to determine a first comparison result;
    wherein the first power is the power, which is detected in previous three times, of the signal component, and the second power is the power, which is detected in previous two times, of the signal component; and
    adjusting the first coefficient based on a first adjustment trend and a first predetermined adjustment value, and the first comparison result, wherein the first adjustment trend is kept being the same as a previous first adjustment trend, in a condition that, based on the first comparison result, the first power is higher than the second power;

the first adjustment trend is adjusted to be the opposite of the previous first adjustment trend, in a condition that, based on the first comparison result, the first power is lower than the second power; and the first coefficient is determined by summing up a value of the first coefficient at previous two times and a product of the first adjustment trend and the first predetermined adjustment value.

16. The correction method of claim 15, wherein adjusting the first coefficient and the second coefficient further comprises:

comparing the first power and the second power again to determine a second comparison result;

adjusting the second coefficient based on a second adjustment trend and a second predetermined adjustment value, and the second comparison result, wherein the second adjustment trend is kept being the same as a previous second adjustment trend, in a condition that, based on the second comparison result, the first power is higher than the second power;

the second adjustment trend is adjusted to be the opposite of the previous second adjustment trend, in a condition that, based on the second comparison result, the first power is lower than the second power; and the second coefficient is determined by summing up a value of the second coefficient at previous two times and a product of the second adjustment trend and the second predetermined adjustment value.

17. The correction method of claim 11, wherein generating the pre-phase correction signal comprises:

multiplying the in-phase data signal with the in-phase data signal to generate a first operation value;

multiplying the quadrature data signal with the quadrature data signal to generate a second operation value;

multiplying the in-phase data signal with the quadrature data signal to generate a third operation value;

subtracting the second operation value from the first operation value to generate a fourth operation value;

multiplying the first coefficient with the fourth operation value to generate a fifth operation value;

multiplying two times of the second coefficient with the third operation value to generate a sixth operation value; and summing up the fifth operation value and the six operation value to generate the pre-phase correction signal.

18. The correction method of claim 11, wherein generating the pre-phase correction signal comprises:

multiplying the in-phase data signal with the in-phase data signal to generate a first operation value;

multiplying the quadrature data signal with the quadrature data signal to generate a second operation value;

multiplying the in-phase data signal with the quadrature data signal to generate a third operation value;

subtracting the second operation value from the first operation value to generate a fourth operation value;

receiving, by a first finite impulse response filter, the fourth operation value to output a fifth operation value;

receiving, by a second finite impulse response filter, the third operation value to output a sixth operation value; and summing up the fifth operation value and the six operation value to generate the pre-phase correction signal.

19. The correction method of claim 18, wherein each of the first finite impulse response filter and the second finite impulse response filter comprises 2N taps, wherein N is a positive integer, and determining coefficients of the 2N taps comprises:

inputting N testing signals having a frequency fi to the transmitter in sequence in a bandwidth of the transmitter, where i=1, 2, . . . , N;

detecting a power of a testing signal component, which has a frequency 2fi or 4fi, in a detection signal while adjusting the first coefficient and the second coefficient, wherein the detection signal is generated according to the first output signal;

storing the first coefficient and the second coefficient as a group of filtering coefficients in a condition that the power of the testing signal component is minimum; and after N groups of the filtering coefficients are obtained, performing an inverse Fourier transform with the N groups of the filtering coefficients and conjugates of the N groups of the filtering coefficients to determine the coefficients of the 2N taps.

20. The correction method of claim 11, wherein generating the first correction signal and the second correction signal comprises:

inputting the pre-phase correction signal, the in-phase data signal, the quadrature data signal to a correction matrix to generate the first correction signal and the second correction signal.

* * * * *